US007868280B2

(12) United States Patent
Park et al.

(10) Patent No.: US 7,868,280 B2
(45) Date of Patent: Jan. 11, 2011

(54) ILLUMINATION SENSING APPARATUS, DRIVING METHOD THEREOF AND DISPLAY DEVICE HAVING THE ILLUMINATION SENSING APPARATUS

(75) Inventors: Hyun-Sang Park, Sungnam-si (KR); Min-Koo Han, Seoul (KR); Doo-Hyung Woo, Ahnyang-si (KR); Jae-Beom Choi, Suwon-si (KR); Kwang-Sub Shin, Ahnyang-si (KR)

(73) Assignee: Samsung Electronics Co., Ltd., Suwon-Si, Gyeongi-Do (KR)

( * ) Notice: Subject to any disclaimer, the term of this patent is extended or adjusted under 35 U.S.C. 154(b) by 187 days.

(21) Appl. No.: 12/179,360

(22) Filed: Jul. 24, 2008

(65) Prior Publication Data

US 2009/0166510 A1 Jul. 2, 2009

(30) Foreign Application Priority Data

Dec. 27, 2007 (KR) ..................... 10-2007-0138365

(51) Int. Cl.
*G01J 1/32* (2006.01)
*G02F 1/1335* (2006.01)

(52) U.S. Cl. .............................. 250/205; 250/214 AL; 345/102; 345/207

(58) Field of Classification Search ................. 250/205, 250/214 AL, 214 AG, 214 R; 349/61; 345/102, 345/207

See application file for complete search history.

(56) References Cited

U.S. PATENT DOCUMENTS 7,492,356 B1 * 2/2009 Pruitt ......................... 345/172
2009/0066876 A1 * 3/2009 Woo et al. ..................... 349/61
2009/0166510 A1 * 7/2009 Park et al. .................. 250/205

* cited by examiner

*Primary Examiner*—John R Lee
(74) *Attorney, Agent, or Firm*—F. Chau & Associates, LLC

(57) ABSTRACT

Provided are an illumination sensing apparatus, a driving method thereof and a display device having the illumination sensing apparatus. The illumination sensing apparatus includes an illumination sensor unit configured to generate a sensing signal according to peripheral illumination, an illumination determination unit configured to generate an illumination signal according to the sensing signal, and an illumination judgment unit configured to output a brightness select signal using the illumination signal, wherein the illumination sensor unit controls sensitivity of sensing the peripheral illumination to be varied according to the brightness select signal. Therefore, the sensitivity of an illumination sensor is automatically controlled according to the peripheral illumination, thus improving peripheral illumination sensibility. Further, an illumination signal corresponding to the peripheral illumination is provided to a light source module to thereby control the output brightness of the light source module, which makes it possible to reduce power consumption and improve image quality.

20 Claims, 7 Drawing Sheets

ILLUMINATION SENSING APPARATUS, DRIVING METHOD THEREOF AND DISPLAY DEVICE HAVING THE ILLUMINATION SENSING APPARATUS

CROSS-REFERENCE TO RELATED APPLICATION

This application claims priority to Korean Patent Application No. 10-2007-0138365 filed on Dec. 27, 2007, and all the benefits accruing therefrom under 35 U.S.C. §119, the contents of which are herein incorporated by reference in their entirety.

BACKGROUND

The present disclosure is directed to an illumination sensing apparatus, a driving method thereof and a display device having the illumination sensing apparatus, and more particularly, to an illumination sensing apparatus capable of automatically controlling the sensitivity according to peripheral illumination and sensing peripheral illumination of a display device to control the brightness of the display device according to the peripheral illumination, a driving method of the illumination sensing apparatus, and a display device having the illumination sensing apparatus.

In general, a technical issue in flat display devices is reducing power consumption. Particularly, since a liquid crystal display device (LCD) is a passive element which cannot emit light by itself, the LCD should receive light from an external light source such as a backlight and thus displays an image. In this case, more power is consumed in the light source rather than in the liquid crystal display panel. Thus, there is a limitation in reducing power consumption in the LCD. In the case where a flat display device is installed in a mobile apparatus using a battery as a power source, the display device consumes a considerable amount of the power of the mobile apparatus, which makes it difficult to drive the mobile apparatus for a long time. Further, the light source of a related display device always emits light with maximum brightness. This causes effulgence in dark surroundings, leading to degradation in image quality.

SUMMARY

Embodiments of the present invention provide an illumination sensing apparatus capable of reducing power consumption and improving image quality by controlling brightness of a display device according to peripheral illumination, a driving method of the illumination sensing apparatus, and a display device having the illumination sensing apparatus.

Embodiments of the present invention also provide an illumination sensing apparatus capable of improving peripheral illumination by automatically controlling the sensitivity, and a display device having the illumination sensing apparatus.

In accordance with an exemplary embodiment of the invention, an illumination sensing apparatus includes: an illumination sensor unit configured to generate a sensing signal according to peripheral illumination; an illumination determination unit configured to generate an illumination signal according to the sensing signal; and an illumination judgment unit configured to output a brightness select signal using the illumination signal, wherein the illumination sensor unit is varied sensitivity of sensing the peripheral illumination according to the brightness select signal.

The illumination sensor unit may include a reference sensor and at least one variable sensor, each having at least one optical sensor. Herein, the at least one optical sensor in the at least one variable sensor may selectively operate according to the brightness select signal.

A number of changes in a logic state of the sensing signal may be variable according to the peripheral illumination.

The illumination signal may be a digital signal having a plurality of bit values, and the brightness select signal is a digital signal of at least 1 bit, and the illumination determination unit may determine upper bit values of the illumination signal using the brightness select signal, and determine remaining bit values other than the upper bit values of the illumination signal using the number of changes in logic state of the sensing signal.

The illumination determination unit may include: a counter configured to count the number of changes in the logic state of the sensing signal to output the counted number as a counting signal; and an output unit configured to output the illumination signal according to the counting signal and the brightness select signal.

The counter may primarily count the number of changes in logic state of the sensing signal during a first half frame, and secondarily count the number of changes in logic state of the sensing signal during a second half frame.

The illumination sensing apparatus may further include an illumination control unit configured to reset the illumination sensor unit and the counter according to an external frame signal.

An most significant bit (MSB) value of the illumination signal may be determined by the brightness select signal, a next MSB value of the illumination signal may be determined by the brightness select signal, or an upper 50% of bit values of the illumination signal may be determined by the brightness select signal.

The illumination judgment unit may compare the remaining bit values except for the upper bit values of the illumination signal with at least one reference illumination value to change a logic state of the brightness select signal.

The illumination determination unit may include: a sensor having a sensing node, and configured to change a decrease rate of a voltage of the sensing node according to the peripheral illumination; a voltage supplier configured to supply a power supply voltage to the sensing node; and a comparator configured to compare the voltage of the sensing node with a reference voltage to output the sensing signal.

The comparator may output the sensing signal of logic high level when the voltage of the sensing node is greater than the reference voltage, and output the sensing signal of logic low level when the voltage of the sensing node is smaller than the reference voltage.

The illumination sensing apparatus may further include a delay configured to delay the sensing signal by a predetermined delay time.

The voltage supplier may include a transfer gate connected between a power supply voltage terminal and the sensing node. Herein, the transfer gate may operate according to an external reset signal and the sensing signal.

The sensor may include: a first sensor configured to form a current path between the sensing node and a ground voltage terminal according to the peripheral illumination; at least one second sensor configured to form a current path between the sensing node and the ground voltage terminal according to the brightness select signal and the peripheral illumination; and a storage unit disposed between the sensing node and the ground voltage terminal, and configured to store the power supply voltage.

The first sensor may include at least one first photodiode provided between the sensing node and the ground voltage terminal. The at least one second sensor may include at least one second photodiode and a sensing transistor which are connected in series between the sensing node and the ground voltage terminal. The storage unit may include a capacitor connected between the sensing node and the ground voltage terminal. The sensing transistor may be turned on according to the brightness select signal.

The second photodiode may be approximately 0.5 to approximately 15 times more sensitive than the first photodiode.

In accordance with another exemplary embodiment of the invention, a display device includes: an illumination sensing apparatus including a reference sensor and at least one variable sensor, each having at least one optical sensor, the illumination sensing apparatus generating an illumination signal by using the reference sensor or using the reference sensor and the variable sensor according to peripheral illumination; a light source module of which output brightness is variable according to the illumination signal; and a display panel configured to display an image according to brightness of the light source module.

The illumination sensing apparatus may include: an illumination sensor unit having a sensing node, and configured to output a sensing signal according to the peripheral illumination by using the reference sensor or using the reference sensor and one of the at least one reference sensor; a counting unit configured to count a number of changes in a logic state of the sensing signal to output the counted number as a counting signal; an output unit configured to output an illumination signal having a plurality of bits using the counting signal and a brightness select signal; and an illumination judgment unit configured to generate the brightness select signal using predetermined bits of the illumination signal. Herein, the variable sensor may be enabled according to the brightness select signal.

The counter may be reset twice during one frame according to a reset signal of the display panel.

In accordance with yet another exemplary embodiment, a method of driving an illumination sensing apparatus, includes: detecting an initial illumination signal according to peripheral illumination using at least one of a plurality of photodiodes included in the illumination sensing apparatus; comparing a value of the initial illumination signal with a reference illumination value; and detecting the illumination signal according to the peripheral illumination using the at least one photodiode when the value of the initial illumination signal is greater than the reference illumination value, and sensing the illumination signal according to the peripheral illumination using the plurality of photodiodes when the value of the initial illumination signal is smaller than the reference illumination value.

DETAILED DESCRIPTION OF EXEMPLARY EMBODIMENTS

Figure 1:
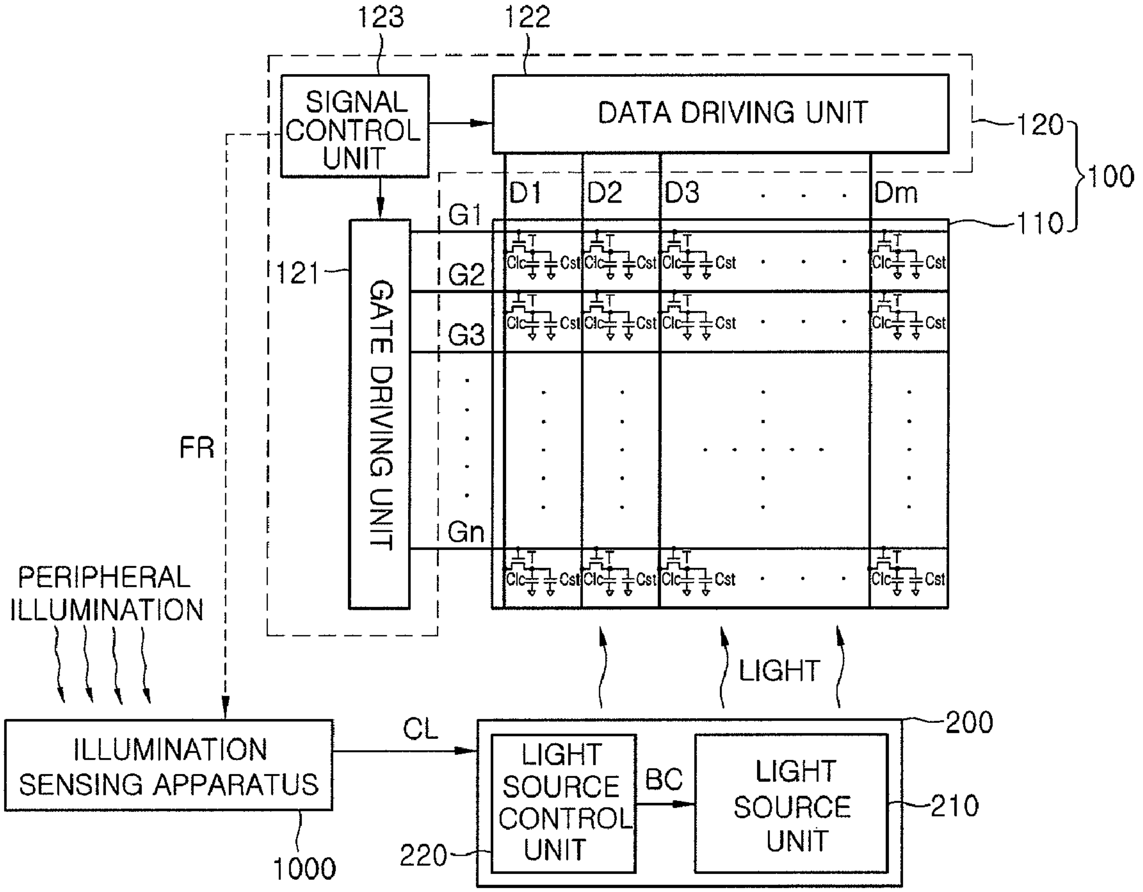
FIG. 1 is a block diagram of a display device having an illumination sensing apparatus in accordance with an exemplary embodiment of the invention.

Hereinafter, specific embodiments will be described in detail with reference to the accompanying drawings. The present invention may, however, be embodied in different forms and should not be construed as being limited to the embodiments set forth herein. In the figures, like reference numerals refer to like elements throughout.

Figure 2:
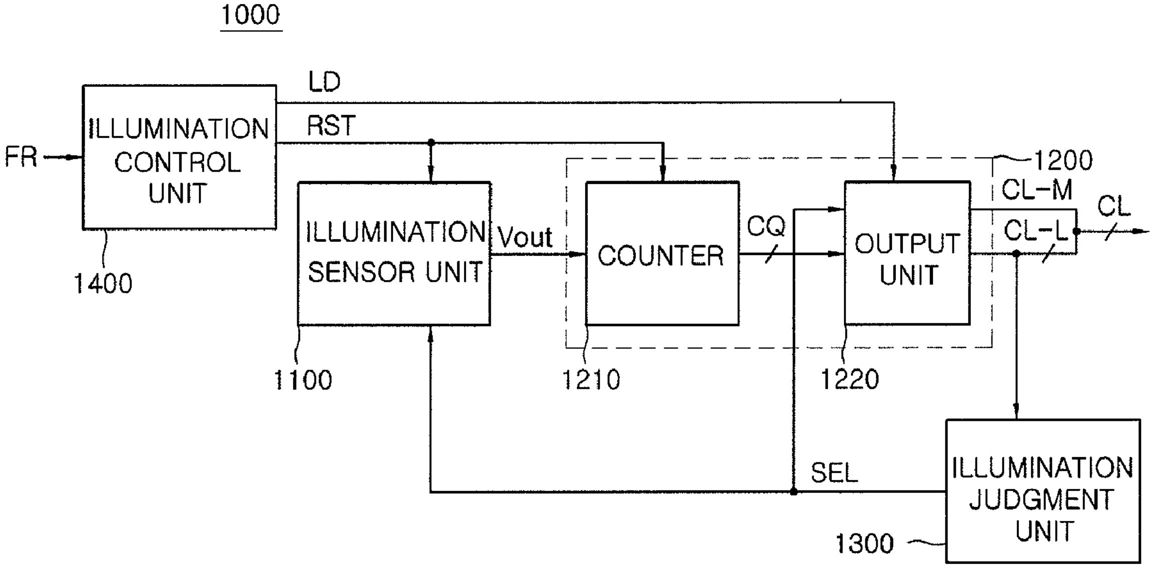
FIG. 2 is a block diagram of the illumination sensing apparatus in accordance with the exemplary embodiment of FIG. 1.
Figure 3:
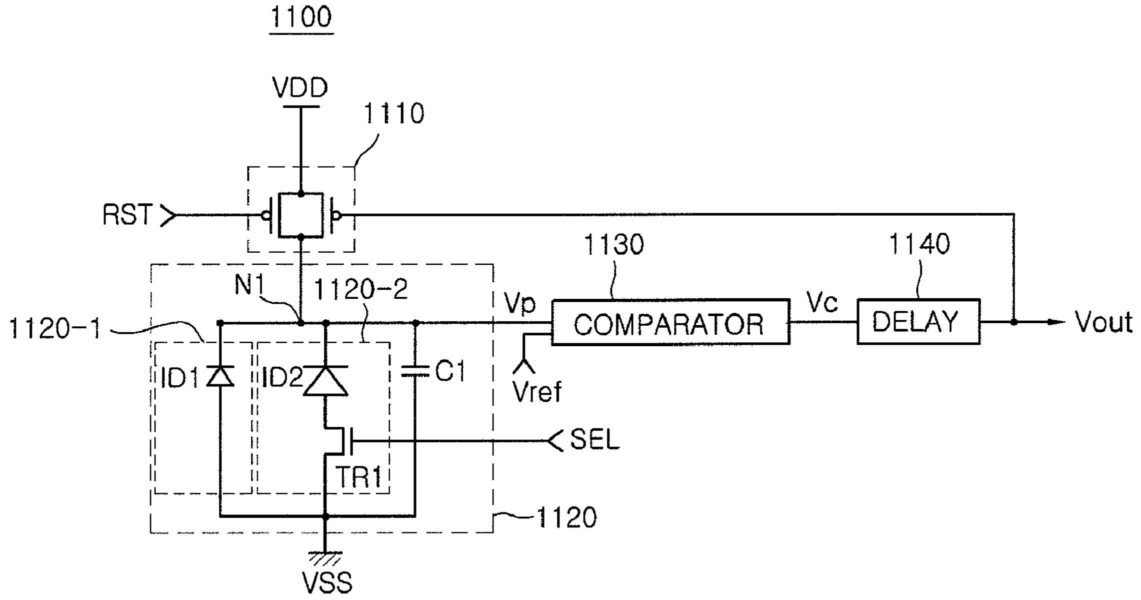
FIG. 3 is a circuit diagram of an illumination sensor unit in accordance with the exemplary embodiment of FIG. 1.
Figure 4:
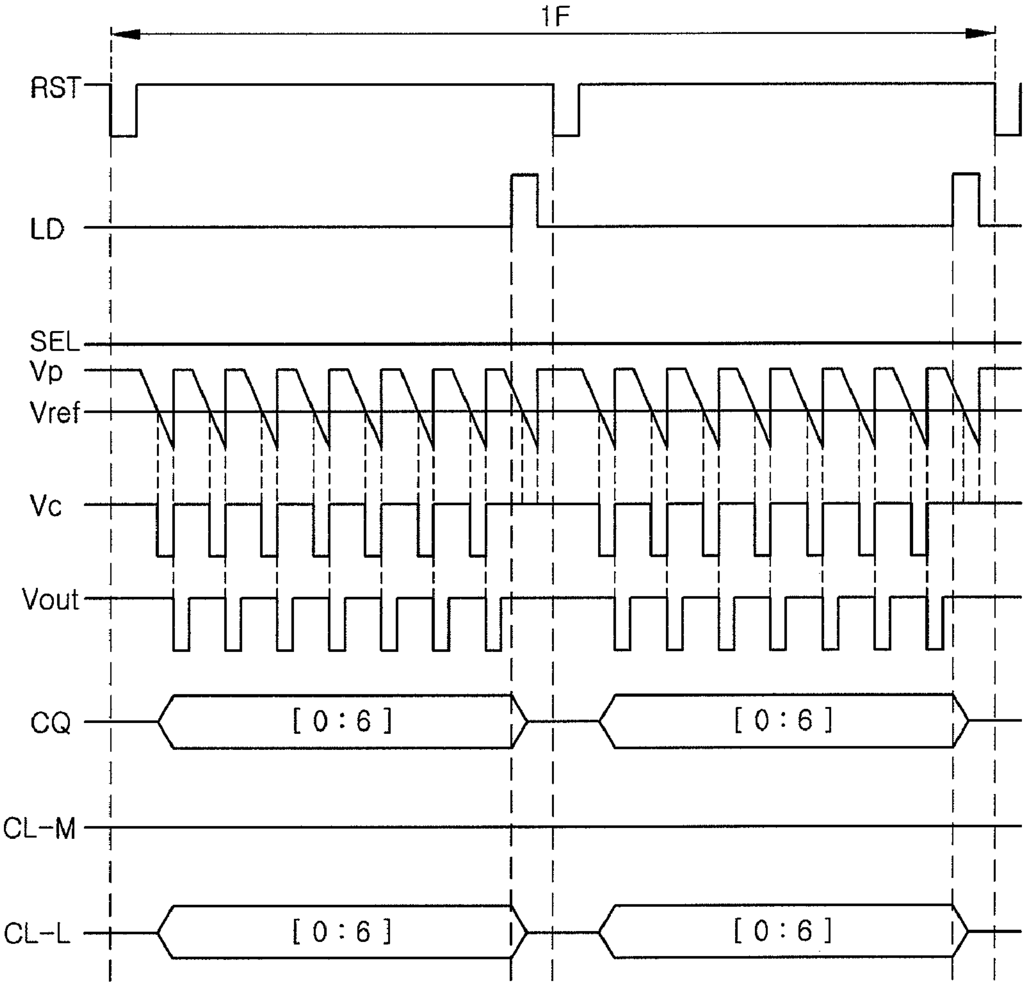
FIGS. 4 and 5 are waveform diagrams of clocks illustrating operation of the illumination sensing apparatus in accordance with the exemplary embodiment of FIG. 1.
Figure 5:
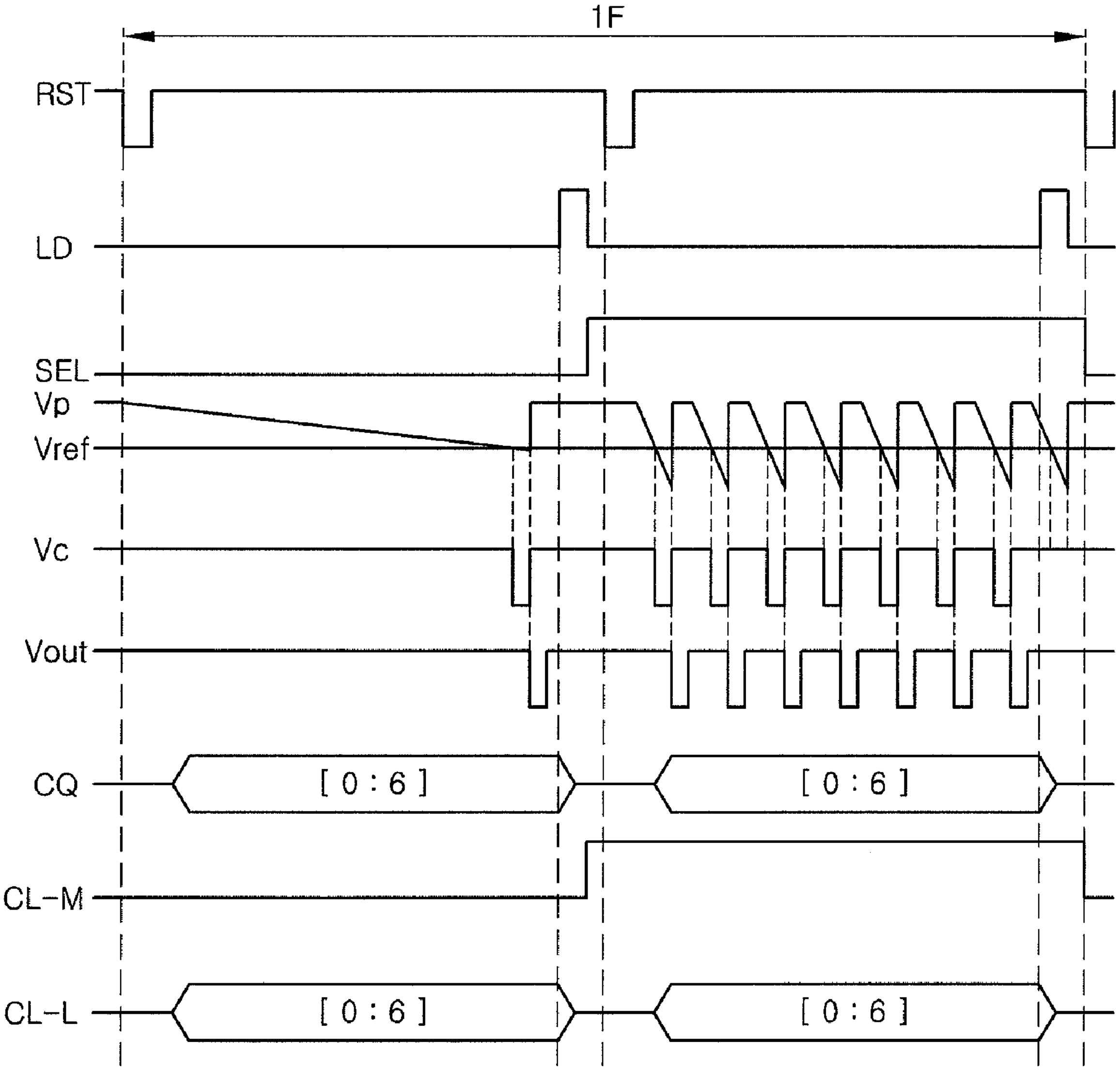

FIG. 1 is a block diagram of a display device having an illumination sensing apparatus in accordance with an exemplary embodiment of the invention. FIG. 2 is a block diagram of the illumination sensing apparatus in accordance with the exemplary embodiment. FIG. 3 is a circuit diagram of an illumination sensor unit in accordance with the exemplary embodiment. FIGS. 4 and 5 are waveform diagrams of clocks illustrating operation of the illumination sensing apparatus in accordance with the exemplary embodiment.

Referring to FIGS. 1 through 5, the display device of this exemplary embodiment includes a display panel 100, a light source module 200 and an illumination sensing apparatus 1000.

The display panel 100 displays an image using light emitted from the light source module 200. In this exemplary embodiment, brightness of the display panel 100 is determined by brightness of the light source module 200. The brightness of the light source module 200 is varied by the illumination sensing apparatus 1000. That is, the illumination sensing apparatus 1000 generates illumination signals with various levels according to peripheral illumination, i.e., according to an intensity or brightness level of light. The illumination sensing apparatus 1000 provides the generated illumination signal to the light source module 200 to control the brightness of the light source module 200. The illumination sensing apparatus 1000 of this exemplary embodiment can automatically control the sensitivity according to the peripheral illumination, making it possible to detect an accurate peripheral illumination value. The illumination sensing apparatus 1000 outputs the peripheral illumination value as an illumination signal. That is, the illumination sensing apparatus 1000 determines that the periphery is bright if the peripheral illumination value is higher than a reference illumination value, thereby decreasing the sensitivity. Contrariwise, the illumination sensing apparatus 1000 determines that the periphery is dark if the peripheral illumination value is lower than the reference illumination value, thereby increasing the sensitivity. The illumination sensing apparatus 1000 of this exemplary embodiment controls the sensitivity during one frame and generates the illumination signal.

Each of the elements in the display device will be more fully described below.

The display panel 100 includes a panel 110 configured to display an image and a panel controller 120 configured to control the panel 110, as illustrated in FIG. 1.

The panel 110 includes a plurality of unit pixels. Each of the unit pixels includes a thin film transistor (TFT) T and a liquid crystal capacitor Clc. The unit pixel may further include a storage capacitor Cst. The liquid crystal capacitor Clc includes a lower pixel electrode, an upper common electrode, and a liquid crystal provided between the pixel electrode and the common electrode. A color filter is provided over the liquid crystal capacitor Clc. Each of the pixel electrode and the common electrode may be divided into a plurality of domains. However, the panel 110 of this exemplary embodiment is not limited to the above-described configuration, and thus it can be variously modified. That is, a plurality of pixels may be provided in a unit pixel region. Further, the unit pixel region may be shaped such that a width differs from a length. Also, the unit pixel region may have a variety of shapes instead of a substantially square shape.

The panel 110 further includes a plurality of gate lines G1 to Gn and a plurality of data lines D1 to Dm, which are respectively connected to the plurality of unit pixels. The TFT (T) includes a gate terminal connected to one of the gate lines G1 to Gn, a source terminal connected to one of the data lines D1 to Dm, and a drain terminal connected to the liquid crystal capacitor Clc. The TFT (T) is turned on in response to a gate turn-on signal applied to the gate line G1 to Gn, and provides an image signal of the data line D1 to Dm to the liquid crystal capacitor Clc. The liquid crystal capacitor Clc changes orientation of the liquid crystal according to the image signal to control light transmittance of the liquid crystal, thereby displaying a desired image.

The panel 110 includes a lower substrate having the TFT and the pixel electrode, and an upper substrate having the common electrode and the color filter. The liquid crystal is provided between the upper substrate and the lower substrate.

The panel controller 120 includes a gate driving unit 121, a data driving unit 122 and a signal control unit 123.

The gate driving unit 121 sequentially provides the gate turn-on signal to the plurality of gate lines G1 to Gn according to a control signal of the signal control unit 123. The data driving unit 122 provides the corresponding image signal to the plurality of data lines D1 to Dm. The signal control unit 123 generates a plurality of control signals to control operations of the gate driving unit 121 and the data driving unit 122. The signal control unit 123 provides a signal associated with an image applied from an external system to the data driving unit 122 as the image signal. A timing controller may be used as the signal control unit 123. Although not shown, the panel controller 120 may further include a voltage generation unit configured to generate a voltage to be applied to the gate and data driving units 121 and 122. In addition, the panel controller 120 may further include a clock control unit configured to control a clock cycle of the gate signal. Further, although not illustrated herein, the panel controller 120 may further include a variety of circuit elements configured to control the operation of the panel 110.

In this exemplary embodiment, each of the elements of the panel controller 120 is formed in an integrated circuit (IC) chip configuration, and may be mounted on a printed circuit board (PCB). The PCB may be connected to the panel 110 through a flexible PCB. However, embodiments of the present invention are not limited to such a configuration, and thus some elements of the panel controller 120 may be mounted on the lower substrate of the panel 110. Also, the gate driving unit 121 may be formed in a stage shape on the lower substrate. That is, the gate driving unit 121 may also be fabricated together with the TFT of the panel 110.

The light source module 200 includes a light source unit 210 and a light source control unit 220 configured to control the operation of the light source unit 210, as illustrated in FIG. 1.

The light source unit 210 may include a plurality of light sources. The light source may include at least one light source selected from a group comprising a plurality of point light sources, a plurality of line light sources and a plurality of surface light sources. Specifically, the light source may be selected from a group comprising a cold cathode fluorescent lamp (CCFL), an external electrode fluorescent lamp (EEFL), a light emitting diode (LED) and a xenon lamp. The light sources can emit light independently.

The light source control unit 220 generates a brightness control signal BC according to an illumination signal CL applied thereto. The brightness control signal BC may use a pulse width modulation (PWM) signal where a pulse width of a voltage or current is modulated. However, the brightness control signal BC is not limited to the PWM signal, and thus an amplitude modulation signal where the amplitude of a voltage or current is modulated may be used as the brightness control signal BC. The light source control unit 220 may include a plurality of inverters configured to provide a voltage or current to the light source unit 210, and an output controller configured to control an output of the inverter according to the illumination signal CL. However, embodiments of the present invention are not limited to the above-described configuration, and thus a variety of additional elements, which can control the brightness of the light source unit 210, may be added to or removed from the light source control unit 220 according to the illumination signal CL.

The illumination sensing apparatus 1000 senses peripheral illumination of the display panel 100 to generate the illumination signal CL corresponding to the peripheral illumination value.

Referring now to FIG. 2, the illumination sensing apparatus 1000 includes an illumination sensor unit 1100, an illumination determination unit 1200, an illumination judgment unit 1300 and an illumination control unit 1400.

The illumination sensor unit 1100 controls the sensitivity according to a reset signal RST and a feedback brightness select signal SEL to thereby output a sensing signal Vout corresponding to the peripheral illumination. The illumination determination unit 1200 receives the reset signal RST, the brightness select signal SEL and the sensing signal Vout to generate the illumination signal CL, and outputs the illumination signal CL according to an output signal LD. The illumination judgment unit 1300 judges the illumination signal CL, and then outputs the brightness select signal SEL of logic low level if the illumination signal CL has a value higher than the set reference value, or outputs the brightness select signal SEL of logic high level if the illumination signal CL has a value lower than the reference value. The illumination control unit 1400 generates the reset signal RST and the output signal LD according to a frame signal FR of the display panel 100.

The illumination sensor unit 1100 includes a power supplier 1110, a sensor 1120 having a sensing node N1, a comparator 1130 and a delay 1140, as illustrated in FIG. 3.

The power supplier 1110 provides a power supply voltage VDD to the sensing node N1 according to the reset signal RTS and the sensing signal Vout output from the illumination sensor unit 1100. As illustrated in FIG. 3, the power supplier 1110 may include a transfer gate that is connected between a power supply voltage (VDD) terminal and the sensing node N1 and turned on in response to the reset signal RTS or the sensing signal Vout. The transfer gate includes a first PMOS transistor and a second PMOS transistor. A gate terminal of the first PMOS transistor is connected to an input terminal of the reset signal RTS, and a gate terminal of the second PMOS transistor is connected to an input terminal of the sensing signal Vout. Source and drain terminals of each of the first and second PMOS transistors are respectively connected to the power supply voltage (VDD) terminal and the sensing node N1. Thus, the power supplier 1110 supplies the power supply voltage VDD to the sensing node N1 when one of the reset signal RTS and the sensing signal Vout goes to a logic low level. Although the transfer gate is used as the power supplier 1110 in this exemplary embodiment, embodiments of the present invention are not limited thereto. Therefore, it is possible to use various other circuit elements that can provide the power supply voltage VDD to the sensing node N1 according to the reset signal RST or the sensing signal Vout.

The sensor 1120 includes a first sensor 1120-1 forming a current path between the sensing node N1 and a ground voltage (VSS) terminal according to external light, a second sensor 1120-2 forming a current path between the sensing node N1 and the ground voltage (VSS) terminal according to external light and brightness select signal SEL, and a load disposed between the sensing node N1 and the ground voltage (VSS) terminal. The load may be a storage element configured to temporarily store the power supply voltage VDD.

The sensor 1120 drops a voltage applied to both ends of the load by operating the first sensor 1120-1 or the first and second sensors 1120-1 and 1120-2 according to external light. Each of the first and second sensors 1120-1 and 1120-2 may include an element configured to change the amount of current according to light. In this exemplary embodiment, each of the first and second sensors 1120-1 and 1120-2 may include a photodiode, as illustrated in FIG. 3. A capacitor may be used as the load.

The sensor 1120 of this exemplary embodiment includes a first photodiode ID1 provided between the sensing node N1 and the ground voltage (VSS) terminal, a second photodiode ID2 connected between the sensing node N1 and the ground voltage (VSS) terminal, a sensing transistor TR1 turned on according to the brightness select signal SEL, and a capacitor C1 connected between the sensing node N1 and the ground voltage (VSS) terminal. Herein, the second photodiode ID2 and the sensing transistor TR1 are connected in series between the sensing node N1 and the ground voltage (VSS) terminal.

Here, the power supply voltage VDD supplied from the power supplier 1110 is charged in the capacitor C1 connected to the sensing node N1. A current flows in the first photodiode ID1 due to external light. Alternatively, a current flows in the first and second photodiodes ID1 and ID2 due to the brightness select signal SEL and the external light. Resultingly, the power supply voltage VDD charged in the capacitor C1 is discharged. Thus, a sensing voltage Vp of the sensor 1120 gradually decreases to a ground voltage level, e.g., 0 V, if the power supply voltage VDD is no longer supplied. In this exemplary embodiment, however, the power supply voltage. VDD can be continuously supplied to the first sensing node N1 based on the sensing signal Vout output from the illumination sensor unit 1100 although the sensing voltage Vp decreases to a predetermined level or lower.

At this time, the sensing transistor TR1 is turned on in response to the brightness select signal SEL of logic high level. Therefore, a current path is formed between the sensing node N1 and the ground voltage (VSS) terminal by the second photodiode ID2 and the sensing transistor TR1. The brightness select signal SEL has a logic high level in the case where peripheral light has a brightness level lower than a set level.

Accordingly, the sensor 1120 of this exemplary embodiment senses peripheral illumination using the first photodiode ID1 if the peripheral illumination is higher than the set level, that is, if the periphery is brighter than the set level. The sensor 1120 senses peripheral illumination using the first and second photodiodes ID1 and ID2 if the peripheral illumination is lower than the set level, that is, if the periphery is darker than the set level. Therefore, the sensitivity can be more improved in dark surroundings than bright surroundings. For example, assume that output values of each of the first and second photodiodes ID1 and ID2 are 10, 15 and 20, respectively, when the light intensity is 100 lux, 500 lux and 1,000 lux. If only the first photodiode ID1 is used, the output values corresponding to 100 lux, 500 lux and 1,000 lux are 10, 15 and 20, respectively. However, if both the first and second photodiodes ID1 and ID2 are used, the output values corresponding to 100 lux, 500 lux and 1,000 lux become 20, 30 and 40, respectively. In this way, in the case where a plurality of photodiodes are connected to each other in parallel and perform a sensing operation, the sensitivity (sensing efficiency) is increased compared to the case of using only one photodiode.

In this exemplary embodiment, the second photodiode ID2 may be approximately 0.5 to approximately 15 times higher in sensitivity than the first photodiode ID1. Here, the sensitivity means a ratio of intensity of incident light to an output magnitude. For instance, if the output of a first photodiode is 1 and the output of a second photodiode is 2 under the condition that the same light is incident on the first and second photodiodes, the sensitivity of the second photodiode is higher than that of the first photodiode. That is, the second photodiode has the sensitivity two times higher than the sensitivity of the first photodiode.

The sensitivity of the photodiode is proportional to a size of the photodiode. Therefore, the second photodiode ID2 may be approximately 0.5 to approximately 15 times greater in size than the first photodiode ID1. When the sensitivity and size of the second photodiode ID2 are below the above-described range, total sensitivity cannot be increased to a desired level. On the other hand, when the sensitivity and size of the second photodiode ID2 are greater than the above-described range, total sensitivity exceeds a measurable range, and the photodiode is so large that it would increase the total size of the device.

As described above, the sensor 1120 decreases a voltage level of the sensing voltage Vp according to the peripheral illumination. Here, a decrease rate of the sensing voltage Vp is proportional to the intensity of the peripheral illumination. The intensity of the peripheral illumination is proportional to the amount of current of the first and second photodiodes ID1 and ID2. As the intensity of the peripheral illumination increases, the amounts of current of the first and second photodiodes ID1 and ID2 increase, causing the decrease rate of the sensing voltage Vp to be increased. Herein, the decrease rate means a time taken for the sensing voltage Vp to be dropped from the power supply voltage VDD to the ground voltage VSS.

The comparator 1130 outputs a comparison voltage Vc of logic low level when the sensing voltage Vp, i.e., the output of the sensor 1120, is lower than the reference voltage Vref. The delay 1140 delays the comparison voltage Vc by a predetermined delay time, and thereafter outputs it as the sensing signal Vout. The delay time may be a time taken for the power supply voltage VDD to be charged in the sensing capacitor C1. Here, the reference voltage Vref may arbitrarily selected between the ground voltage VSS and the power supply voltage VDD because it is variable according to the sensitivities of the first and second photodiodes ID1 and ID2 in the sensor 1120. The reference voltage Vref may be in the range of approximately 0.1 V to approximately 70% of the power supply voltage VDD.

Therefore, when a level of the sensing voltage Vp, i.e., voltage of the sensing node N1, decreases to be lower than the reference voltage Vref due to the peripheral illumination, the delay 1140 outputs the sensing signal Vout of logic low level. The transfer gate of the power supplier 1110 is turned on to increase a voltage level of the sensing voltage Vp to a level of the power supply voltage VDD again. Consequently, the comparison voltage Vc of the comparator 1130 maintains its logic high level, and the delay 1140 outputs the sensing signal Vout of logic high level.

If the intensity of the peripheral illumination is low, a decrease rate of the voltage level of the sensing voltage Vp is small. On the other hand, if the intensity of the peripheral illumination is high, the decrease rate of the voltage level of the sensing voltage Vp is large. Therefore, as the intensity of peripheral illumination increases, the sensing signal Vout has more logic low states during the same period.

Thus, a change in a voltage level of the sensing signal Vout is varied according to the peripheral illumination in the illumination sensor unit 1100 of this exemplary embodiment.

The illumination determination unit 1200 determines the illumination signal CL using the number of changes in a voltage level of the sensing signal Vout.

The illumination determination unit 1200 includes a counter 1210 and an output unit 1220, as illustrated in FIG. 2.

The counter 1210 is initialized by the reset signal RST, and counts the number of logic low levels of the sensing signal Vout to output the counted number as a digitalized counting signal CQ. The output unit 1220 outputs the illumination signal CL having several bits according to the output signal LD, the counting signal CQ and the brightness select signal SEL. The illumination signal CL may be an 8-bit digital signal. Therefore, it is possible to reduce a number of lines for providing the illumination signal CL to the light source module 200. Here, the output unit 1220 outputs the counting signal CQ as a lower bit illumination signal CL-L according to the output signal LD, and outputs the brightness select signal SEL as a most significant bit (MSB) illumination signal CL-M.

The illumination judgment unit 1300 includes a comparator where a reference brightness value is stored. The illumination judgment unit 1300 outputs the brightness select signal SEL of logic high level when the lower bit illumination signal CL-L is lower than a reference illumination value. This means that the peripheral brightness is lower than the reference brightness. When the lower bit illumination signal CL-L is higher than the reference illumination value, the illumination judgment unit 1300 outputs the brightness select signal SEL of logic low level. This means that the peripheral brightness is higher than the reference brightness. Therefore, when the brightness select signal SEL is at a logic low level, a logic value of the MSB of the illumination signal CL is logic Low. If the brightness select signal SEL is at a logic low level, that is, the periphery is relatively bright, logic values of remaining lower bits are determined using only the first photodiode ID1 in the illumination sensor unit 1100. When the brightness select signal SEL goes to a logic high level, a logic value of the MSB (hereinafter, also referred to as 'MSB value' for simplicity) of the illumination signal CL is logic High. When the brightness select signal SEL has a logic high level, the sensing transistor TR1 of the illumination sensor unit 1100 is turned on so that logic values of the remaining bits (hereinafter, also referred to as 'remaining bit values' for simplicity) are determined using the first and second photodiodes ID1 and ID2.

The illumination control unit 1400 outputs the reset signal RST and the output signal LD according to the frame signal FR of the display panel 100.

As described above, the illumination sensing apparatus 1000 of this exemplary embodiment first senses peripheral illumination, and then determines whether the peripheral illumination is higher than the reference illumination. The MSB value of the illumination signal CL used for controlling the brightness of the light source module 200 is determined according to the determination result. Thereafter, the illumination sensing apparatus 1000 determines whether to measure the peripheral illumination using the first photodiode ID1 or using the first and second photodiodes ID1 and ID2. Afterwards, the illumination sensing apparatus 1000 senses the peripheral illumination again to thereby determine the remaining bit values of the illumination signal CL.

The illumination sensing apparatus 1000 of this exemplary embodiment of the invention performs the aforesaid determination operations during one frame.

That is, the illumination sensing apparatus 1000 determines the MSB value of the illumination signal CL and the sensitivity during the first half frame, and determines the remaining bit values of the illumination signal CL during the second half frame. To this end, the reset signal RST is applied twice during one frame.

However, embodiments of the present invention are not limited to the above description, and thus the two determination operations may be respectively performed during different frames. For example, the sensitivity and the MSB value of the illumination signal CL may be determined during one frame, and the remaining bit values of the illumination signal CL may be determined during another frame.

The sensing result achieved during the first half frame is provided to determine the sensitivity and the MSB value of the illumination signal CL. Therefore, although the illumination signal CL output from the illumination determination unit 1200 is applied to the light source module 200, the light source module 200 does not receive the illumination signal CL. To this end, the output signal LD may be provided to the light source control unit 220 of the light source module 200. Therefore, the light source control unit 220 receives only the illumination signal CL applied after the second output signal, thereby generating the brightness control signal BC.

An inverter is mounted on each element in the illumination sensing apparatus 1000 to change logic states of the signals.

Operation of the illumination sensing apparatus 1000 of this exemplary embodiment of the invention will be described below with reference to the accompanying drawings.

Figure 6:
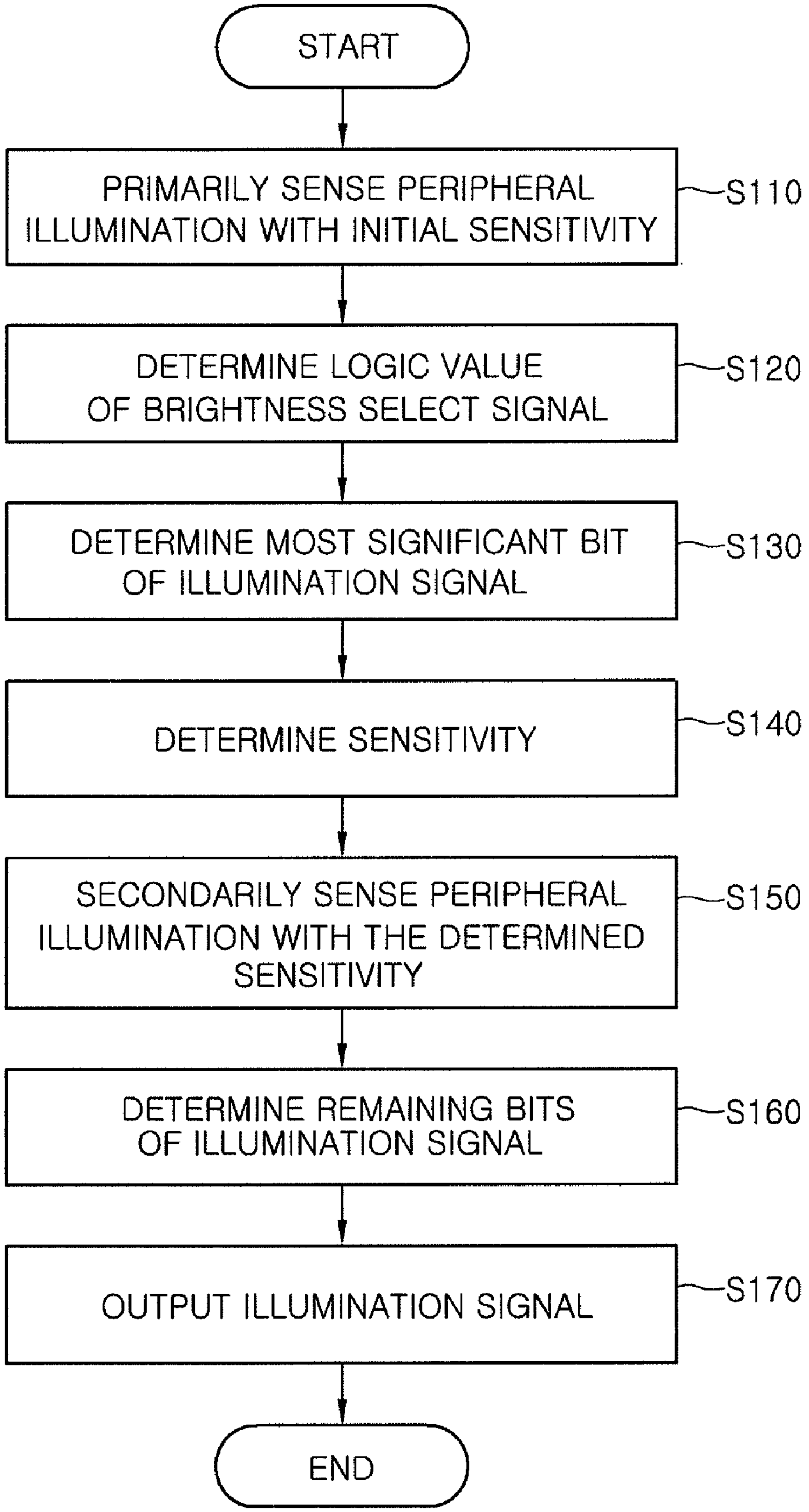
FIG. 6 is a flowchart illustrating operation of the illumination sensing apparatus in accordance with the exemplary embodiment of FIG. 1.

FIG. 6 is a flowchart illustrating operation of the illumination sensing apparatus 1000 in accordance with an exemplary embodiment of the invention.

The illumination sensing apparatus 1000 first determines sensitivity according to peripheral illumination, and thereafter generates an illumination signal corresponding to the peripheral illumination using the determined sensitivity.

In operation S110, the peripheral illumination is sensed primarily with initial sensitivity, as illustrated in FIG. 6. Some elements of the illumination sensing apparatus 1000 are reset before the peripheral illumination is primarily sensed. Thereafter, in operation S120, a logic value of the brightness select signal SEL is determined using the sensing result achieved with the initial sensitivity. The logic value of the sensing signal Vout of the illumination sensor unit 1100 is changed according to the peripheral illumination after which the changed logic value is counted, and the logic value of the brightness select signal SEL is determined using the counting result and a preset reference illumination value. Subsequently, in operation S130, the MSB of the sensing signal CL is determined according to the logic value of the brightness select signal SEL. In operation S140, the sensitivity is determined according to the logic value of the brightness select signal SEL. Afterwards, in operation S150, the peripheral illumination is sensed secondarily using the newly determined sensitivity. Some elements of the illumination sensing apparatus 1000 are reset before the peripheral illumination is secondarily sensed. Next, in operation S160, the remaining bits of the illumination signal CL are determined using the secondarily sensed peripheral illumination. The number of changes in logic value of the sensing signal obtained by sensing the peripheral illumination using the determined sensitivity is counted, and then the remaining bits of the illumination signal CL are generated using the counting result. Thereafter, in operation S170, the combination of the MSB and the remaining bits of the illumination signal CL is output as the illumination signal CL. The output illumination signal is applied to the light source module 200 to allow light with brightness corresponding to the illumination signal to be output.

In this way, an illumination sensing apparatus 1000 of this exemplary embodiment of the invention may determine whether to control sensitivity or to generate the illumination signal CL corresponding to the reset signals RST.

Referring now to FIGS. 4 and 5, in this exemplary embodiment, two reset signals RST are applied during one frame. That is, a first reset signal RST is applied at the time when the frame starts, and a second reset signal RST is applied at the beginning of the second half frame. Here, after the first reset signal RST is applied, the sensitivity is controlled and the MSB illumination signal CL-M is generated. After the second reset signal RST is applied, the lower bit illumination signal CL-L except for the MSB is generated. Finally, the illumination signal CL containing the MSB illumination signal CL-M and the remaining lower bit illumination signal CL-L is generated.

Operation after the first reset signal RST is applied, that is, operation of outputting the sensing signal by primarily sensing the peripheral illumination with initial sensitivity, will be illustrated below.

When the first reset signal RST of logic low level is applied, the power supply voltage VDD is applied to the sensing node N1 of the illumination sensor unit 1100. The power supply voltage VDD is charged in the sensing capacitor C1. Thereafter, the first photodiode ID1 operates according to peripheral illumination, thereby forming a current path between the sensing node N1 and the ground voltage (VSS) terminal. When the sensing capacitor C1 is completely charged and the rest signal RST goes to a logic high level, the sensing voltage Vp, i.e., the output of the sensor 1120 is gradually decreased from the power supply voltage VDD. The voltage decrease rate may be increased or decreased according to the peripheral illumination. That is, when the periphery is bright, the amount of current of the first photodiode ID1 increases to rapidly drop the sensing voltage Vp, as illustrated in FIG. 4. On the contrary, when the periphery is dark, the amount of current of the first photodiode ID1 decreases to slowly drop the sensing voltage Vp, as illustrated in FIG. 5.

When the sensing voltage Vp is decreased to be lower than the reference voltage Vref, the comparator 1130 outputs the comparison voltage Vc of logic low level. The comparison voltage Vc is delayed by a predetermined delay time while passing through the delay 1140, and thereafter output as the sensing signal Vout of logic low level. The sensing signal Vout of logic low level is feedback to the power supplier 1110 of the illumination sensor unit 1100. The power supplier 1110, which receives the sensing signal Vout of logic low level, supplies the power supply voltage VDD to the sensing node N1 again. Consequently, the voltage level of the sensing voltage Vp of the sensor 1120 rises to the power supply voltage VDD again. The comparator 1130 outputs the comparison voltage Vc of logic high level again. The comparison voltage Vc of logic high level is delayed through the delay 1140 and then output as the sensing signal Vout of logic high level. Thus, the power supply voltage VDD is not supplied from the power supplier 1110.

Thereafter, as described above, the level of the sensing voltage Vp is decreased by the first photodiode ID1.

In this way, in the illumination sensor unit 1100 of this exemplary embodiment of the invention, the sensing signal Vout goes to a logic low level when the sensing voltage Vp is decreased by the first photodiode ID1 to be lower than the reference voltage Vref. Although changes in logic state of the sensing signal Vout may be repeated at least once during ½ frame, it may be varied with the amount of current of the first photodiode ID1. That is, as the amount of current of the first photodiode ID1 increases, the number of changes in the logic states of the sensing signal Vout increases. Herein, the amount of current of the first photodiode ID1 is proportional to the intensity of the peripheral illumination. Therefore, as the peripheral illumination increases, the number of changes in logic state of the sensing signal Vout increases. In other words, as the quantity of peripheral light decreases, that is, as the quantity of light incident on the first photodiode decreases, the number of changes in the logic states of the sensing signal Vout decreases, e.g., to approximately once, as illustrated in FIG. 5. On the other hand, as the quantity of peripheral light increases, the number of changes in the logic states of the sensing signal Vout increases, e.g., to approximately 7, as illustrated in FIG. 4.

The operation of determining the logic value of the brightness select signal SEL and determining the MSB of the illumination signal will be described below.

The counter 1210 of the illumination determination unit 1200 counts the number of changes in logic state of the sensing signal Vout, and then outputs the counted number as a counting signal CQ. The counter 1210 performs a counting operation until the reset signal RST is applied from the outside.

The output unit 1220 stores the counting signal CQ. The output unit 1220 outputs the stored counting signal CQ as the lower bit illumination signal CL-L at the time when the output signal LD is applied. For example, the lower bit illumination signal CL-L of the illumination determination unit 1200 in FIG. 4 becomes 0000111, and the lower bit illumination signal CL-L of the illumination determination unit 1200 in FIG. 5 becomes 0000001.

The lower bit illumination signal CL-L is provided to the illumination judgment unit 1300. The illumination judgment unit 1300 compares the lower bit illumination signal CL-L with the reference illumination value. When the lower bit illumination signal CL-L is lower than the reference illumination value, the brightness select signal SEL is set to a logic high level. When the lower bit illumination signal CL-L is higher than the reference illumination value, the brightness select signal SEL is set to a logic low level. For example, assuming that the reference illumination value is 0000010, the brightness select signal SEL is 0 when the lower bit illumination signal CL-L is 000011 as illustrated in FIG. 4, and the brightness select signal SEL is 1 when the lower bit illumination signal CL-L is 0000001 as illustrated in FIG. 5.

A value that the lower bit illumination signal CL-L can express is in the range of 1 (0000001) to 127 (1111111). Therefore, the reference illumination value may be in the range of 1 (0000001) to 126 (1111110). Desirably, the reference illumination value may be 64 (1000000) or less. More desirably, the reference illumination value may be 8 (0001000) or less to broaden a measurement range during a next measurement of the peripheral illumination. In other words, the reference illumination value may be 99% or less of the maximum size that the lower bit illumination signal CL-L can express, desirably 50% or less of the maximum size, and more desirably 6% or less of the maximum size. Here, it is sufficient that the reference illumination value may be 10% or less of the maximum size that the lower bit illumination signal CL-L can express. In this way, it is possible to change measurement sensitivity during the peripheral illumination measurement performed after determination of the brightness select signal SEL.

The determined brightness select signal SEL is applied to the output unit 1220 of the illumination determination unit 1200, and the illumination sensor unit 1100.

Consequently, the output unit 1220 outputs the brightness select signal SEL as the MSB illumination signal CL-M. That is, when the brightness select signal SEL is 0 as shown in FIG. 4, the MSB illumination signal CL-M is 0. When the brightness select signal SEL is 1 as shown in FIG. 5, the MSB illumination signal CL-M is 1.

Operation of determining sensitivity will be described below.

The illumination sensor unit 1100 determines whether to use the second photodiode ID2 for sensing the peripheral illumination according to the brightness select signal SEL. When the brightness select signal SEL is 0 as shown in FIG. 4, the sensing transistor TR1 of the sensor 1120 is turned off so that the second photodiode ID2 is disabled. This means that the peripheral illumination can be sufficiently sensed using only the first photodiode ID1 because there is a great quantity of light in the periphery. When the brightness select signal SEL is 1 as shown in FIG. 5, the sensing transistor TR1 is turned on so that the second photodiode ID2 is enabled. This means that the peripheral illumination can be precisely sensed using the first and second photodiodes ID1 and ID2 because there is a small quantity of light in the periphery.

Operation of applying the second reset signal RST and secondarily sensing the peripheral illumination with the newly determined sensitivity will be described below.

Operation of the illumination sensor unit 1100 after the second reset signal RST is applied may be divided into two types according to the brightness select signal SEL. First, when the brightness select signal SEL is 0 as shown in FIG. 4, operation is performed in the same manner as the operation performed after the reset signal RST is primarily applied, thus generating the lower bit illumination signal CL-L. That is, the illumination sensor unit 1100 outputs the sensing signal Vout using the first photodiode ID1. The number of changes in logic level of the sensing signal Vout is variable according to the quantity of peripheral light. The counter 1210 counts the number of changes, e.g., approximately 7, in logic level of the sensing signal Vout, and outputs the counting result as a 7-bit counting signal CQ, i.e., 0000111. According to the second output signal LD, the output unit 1220 outputs the counting signal CQ as the lower bit illumination signal CL-L, i.e., 0000111, and outputs the previously inputted brightness select signal SEL as the MSB illumination signal CL-M, i.e., 0. The MSB illumination signal CL-M and the lower bit illumination signal CL-L are combined so that the illumination signal CL, i.e., 00000111, is output. As described above, when the brightness select signal SEL is at a logic low level (i.e., 0), the lower bit illumination signal CL-L generated during the operation of outputting the illumination signal may be identical to the lower bit illumination signal CL-L generated during the operation of determining the sensitivity.

When the brightness select signal SEL is 1 as illustrated in FIG. 5, the second photodiode ID2 of the illumination sensor 1100 is enabled. Therefore, the illumination sensor unit 1100 outputs the sensing signal Vout using the first and second photodiodes ID1 and ID2. The amount of current of the first and second photodiodes ID1 and ID2 is changed according to the quantity of peripheral light. In this way, since the two photodiodes are used, it is possible to obtain a more sensitive output even though the peripheral illumination is lowered, increasing a decrease rate of a voltage of the sensing node N1. Therefore, the number of changes in logic level of the sensing signal Vout is variable.

Operation of determining the remaining bit values of the illumination signal to output the illumination signal will be described below.

The counter 1210 counts the number of changes (approximately 7) in logic level of the sensing signal Vout, and outputs the counting result as the 7-bit counting signal CQ, i.e., 0000111. According to the second output signal LD, the output unit 1220 outputs the counting signal CQ, i.e., 0000111 as the lower bit illumination signal CL-L, and outputs the previously inputted brightness select signal SEL as the MSB illumination signal CL-M, i.e., 1. The MSB illumination signal CL-M and the lower bit illumination signal CL-L are combined so that the illumination signal CL, i.e., 10000111 is output. When the brightness select signal SEL is at a logic high level, the lower bit illumination signal CL-L generated during the operation of outputting the illumination signal may not be identical to the lower bit illumination signal CL-L generated during the operation of determining the sensitivity. This is because the second photodiode ID2 is enabled to increase the sensitivity of the sensor 1120.

An 8-bit illumination signal CL of the illumination sensing apparatus 1000 is provided to the light source control unit 220. The light source control unit 220 controls the brightness of the light source unit 210 according to the illumination signal CL. If the MSB value of the illumination signal CL is 1, that is, if the peripheral illumination is low, the light source unit 210 emits light of a brightness level of 50% or less of the maximum brightness. If the MSB is 0, that is, the peripheral illumination is high, the light source unit 210 can emit light of a brightness level of 50% or more of the maximum brightness.

Consequently, the illumination sensing apparatus 1000 of this exemplary embodiment of the invention can control the sensitivity of the illumination sensor unit according to the peripheral illumination. Hence, it is possible to improve illumination sensitivity resolution and to measure the illumination over a wide range. Further, the number of output bits of the illumination sensing apparatus 1000 can be reduced. Following Table 1 is an example illustrating the number of bits of the illumination signal CL according to the peripheral illumination.

TABLE 1

| Peripheral illumination (lux) | Most significant bit | Remaining bits |
|---|---|---|
| 10 | 1 | 0000100 |
| 50 | 1 | 0010001 |

TABLE 1-continued

| Peripheral illumination (lux) | Most significant bit | Remaining bits |
|---|---|---|
| 100 | 1 | 0100001 |
| 500 | 1 | 0110001 |
| 1,000 | 1 | 1000000 |
| 5,000 | 0 | 0001110 |
| 10,000 | 0 | 0011110 |
| 50,000 | 0 | 0101110 |
| 100,000 | 0 | 0111110 |

In the example illustrated in Table 1, it is determined that the peripheral illumination is low when the peripheral illumination is lower than 1,000 lux. On the other hand, when the peripheral illumination is higher than 1,000 lux, it is determined that the peripheral illumination is high. That is, as described above, when the peripheral illumination is lower than 1,000 lux, the MSB value of the illumination signal CL is set to 1, and values corresponding to the illumination less than the 1,000 lux are expressed as lower bits of the illumination signal CL using remaining 7 bits. If the illumination is low, an output value of the sensor is very small in comparison with the case of high illumination. In the exemplary embodiment of the invention, however, a separate sensor operates in addition to increase the sensor output value when the illumination is low. Further, when the peripheral illumination is greater than 1,000 lux, the MSB value of the illumination signal CL is set to 0, values corresponding to the illumination more than 1,000 lux and less than 100,000 lux are expressed as lower bits of the illumination signal CL using remaining 7 bits.

The illumination sensing apparatus 1000 controls output brightness of the light source module 200 according to the peripheral brightness of the display panel 100, making it possible to reduce power consumption.

Alternatively, the illumination sensing apparatus is not limited to the above-described structure, and thus it may be variously modified.

Figure 7:
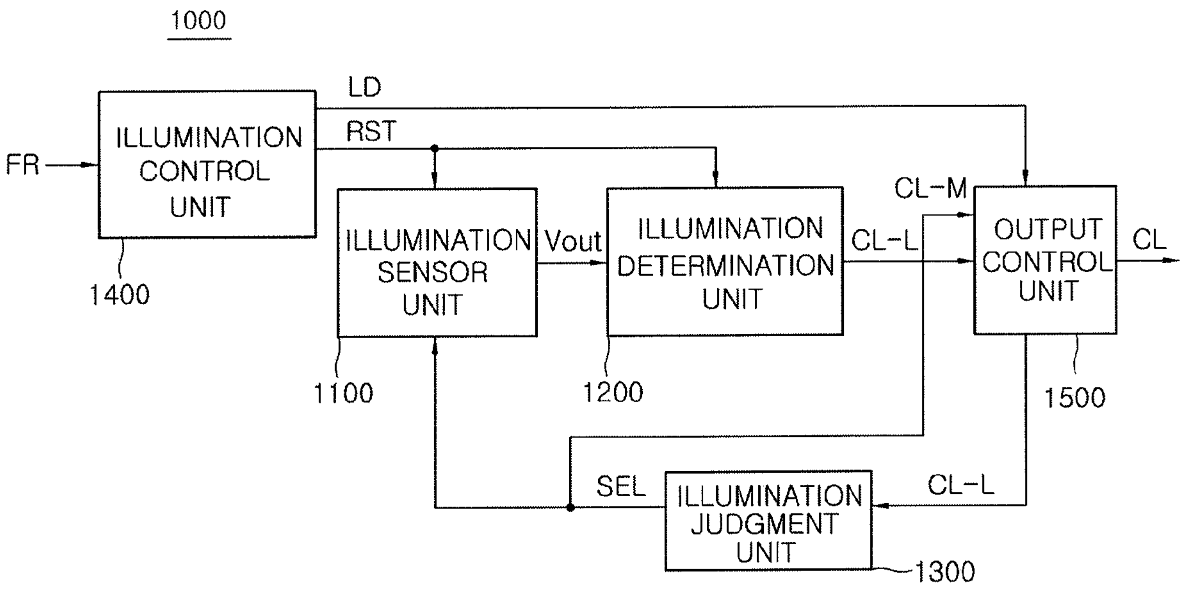
FIG. 7 is a block diagram of an illumination sensing apparatus in accordance with another exemplary embodiment of the invention.
Figure 8:
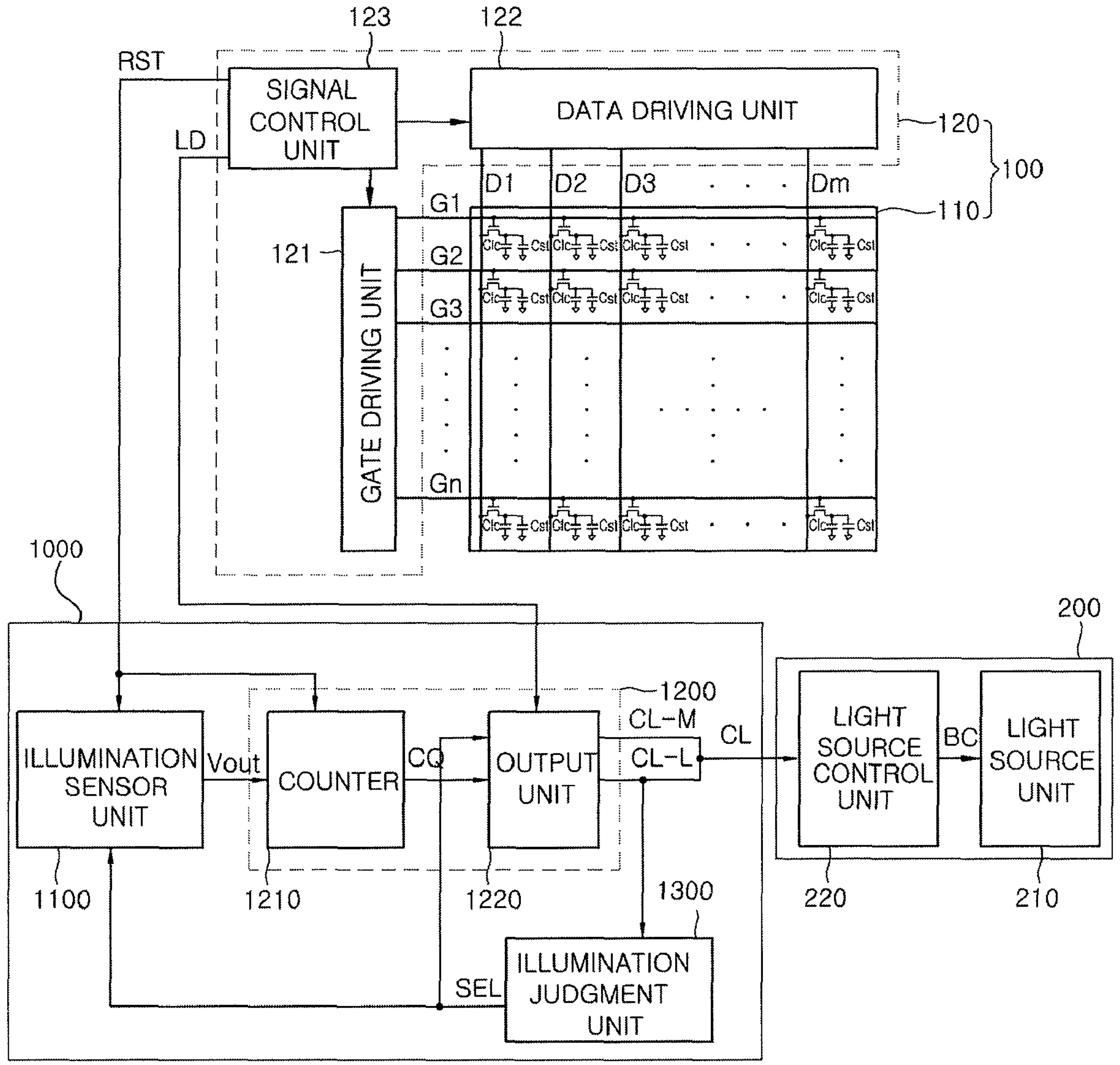
FIG. 8 is a block diagram of a display device having an illumination sensing apparatus in accordance with the exemplary embodiment of FIG. 7.
Figure 9:
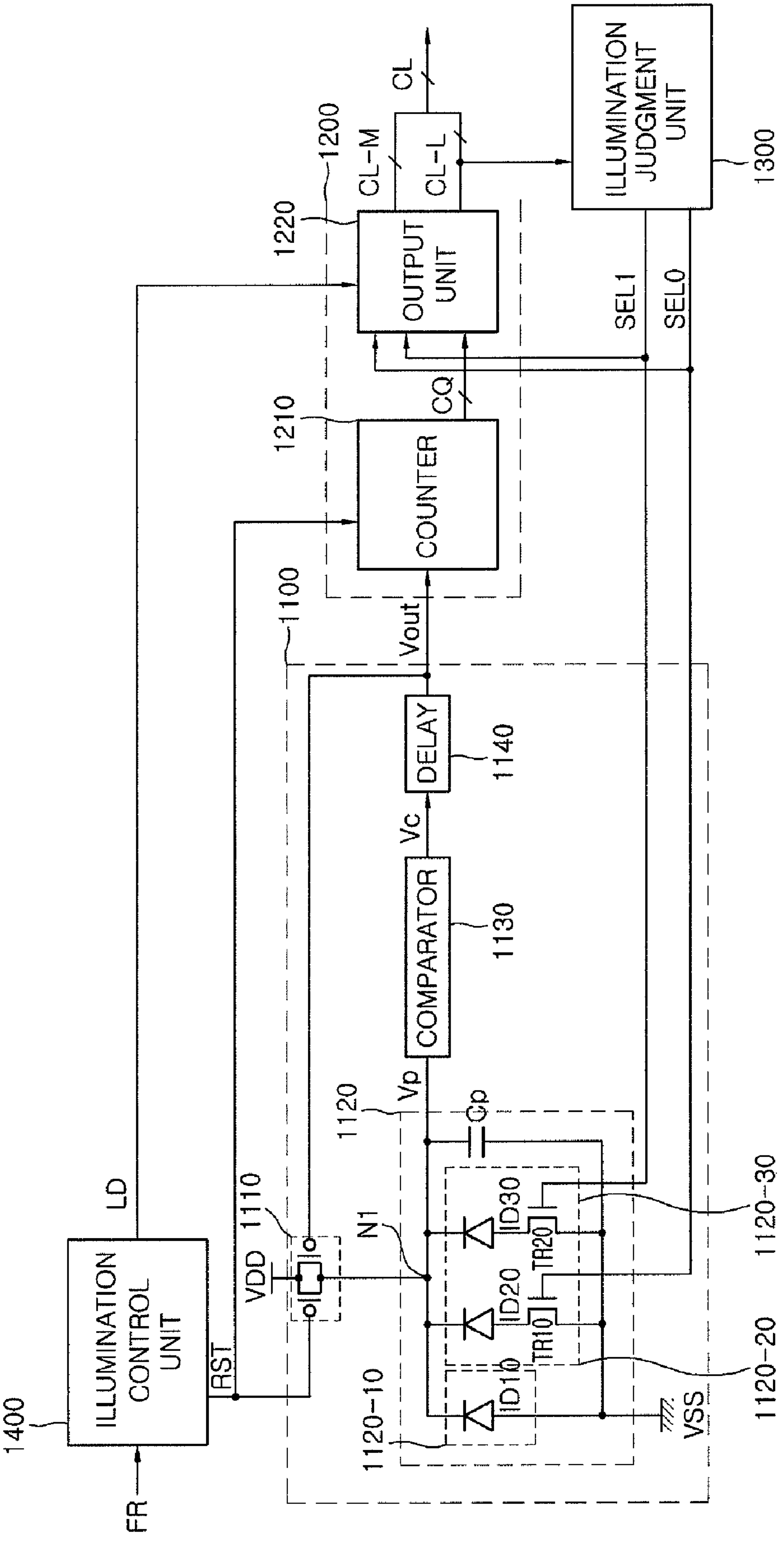
FIG. 9 is a block diagram of an illumination sensing apparatus in accordance with still another exemplary embodiment of the invention.

FIG. 7 is a block diagram of an illumination sensing apparatus in accordance with another exemplary embodiment of the invention. FIG. 8 is a block diagram of a display device having an illumination sensing apparatus in accordance with the exemplary embodiment of FIG. 7. FIG. 9 is a block diagram of an illumination sensing apparatus in accordance with still another exemplary embodiment of the invention.

As illustrated in FIG. 7, the illumination sensing apparatus 1000 may further include an output control unit 1500.

Here, the illumination determination unit 1200 outputs the lower bit illumination signal CL-L according to the sensing signal Vout of the illumination sensor unit 1100. The output control unit 1500 operates according to the output signal LD to provide the lower bit illumination signal CL-L to the illumination judgment unit 1300 or to provide the illumination signal CL to the light source module 200. The illumination judgment unit 1300 outputs the brightness select signal SEL using the lower bit illumination signal CL-L of the output control unit 1500. The brightness select signal SEL is provided to the output control unit 1500 as the MSB value of the illumination signal CL. In this exemplary embodiment, the output signal LD is applied twice during one frame period. The output control unit 1500 provides the lower bit illumination signal CL-L generated through the illumination determination unit 1200 to the illumination judgment unit 1300 according to the output signal LD that is primarily applied. Thereafter, the output control unit 1500 outputs the illumination signal CL containing the lower bit illumination signal CL-L according to the output signal LD that is secondarily applied. Although not shown, the illumination judgment unit 1300 may be reset by the reset signal RST.

As illustrated in the modification of FIG. 8, the illumination control unit 1400 of the illumination sensing apparatus 1000 may be included in the panel controller 120 of the display panel 100. That is, the illumination control unit 1400 may be integrally formed with the signal control unit 123 of the panel controller 120. The illumination sensing apparatus 1000 may receive the reset signal RST and the output signal LD from the signal control unit 123.

The display device of an exemplary embodiment of the invention may further include a receiving member configured to receive the display panel 100 and the light source module 200, and a cover configured to cover the display panel 100. Herein, an illumination sensor unit 1100 of the illumination sensing apparatus 1000 may be disposed on the cover. Further, it may be more effective that first and second photodiodes ID1 and ID2 of the illumination sensor unit 1100 are formed on the cover. To measure the quantity of peripheral light, the first and second photodiodes ID1 and ID2 may be disposed in a region adjacent to the display panel 100 while the cover does not block light entrance. A through-hole is provided at one side of the cover, and the first and second photodiodes ID1 and ID2 may be disposed in the through-hole. A transparent cover may be provided over the through-hole to protect the first and second photodiodes ID1 and ID2. The other elements of the illumination sensing apparatus 1000 may be mounted on the display panel 100, or mounted on the light source module 200.

Referring now to FIG. 9, the illumination judgment unit 1300 may output a plurality of brightness select signals SEL0 and SEL1 according to a plurality of reference illumination values. The sensor 1120 includes a plurality of sensors operating according to the plurality of brightness select signals SEL0 and SEL1 as well as an initial measuring sensor ID10, thereby variously controlling the sensitivity. Here, it is possible to control the brightness of backlight according to the peripheral illumination by using the plurality of brightness select signals SEL0 and SEL1 as upper bits of the illumination signal CL and using the output of the sensor 1120 as lower bits.

As illustrated in the modification of FIG. 9, the illumination sensing apparatus of this exemplary embodiment includes an illumination judgment unit 1300 configured to generate first and second brightness select signals SEL0 and SEL1, and a sensor 1120 having $10^{th}$, $20^{th}$, and $10^{th}$ sensors 1120-10, 1120-20 and 1120-30. Specifically, the sensor 1120 includes a $10^{th}$ sensor (i.e., a reference sensor) 1120-10 configured to form a current path between a sensing node N1 and a ground voltage (VSS) terminal according to external light, a $20^{th}$ sensor (i.e., a first variable sensor) 1120-20 configured to form a current path between the sensing node N1 and the ground voltage (VSS) terminal according to the external light and the first brightness select signal SEL0, a $30^{th}$ sensor (i.e., a second variable sensor) 1120-30 configured to form a current path between the sensing node N1 and the ground voltage (VSS) terminal according to the external light and the second brightness select signal SEL1, and a load connected between the sensing node N1 and the ground voltage (VSS) terminal. The load may be a storage element configured to temporarily store the power supply voltage VDD. Here, the $10^{th}$ sensor 1120-10 includes a $10^{th}$ photodiode ID10 connected between the sensing node N1 and the ground voltage (VSS) terminal.

The $20^{th}$ sensor 1120-20 includes a $20^{th}$ photodiode ID20 and a $10^{th}$ sensing transistor T10 connected in series between the sensing node N1 and the ground voltage (VSS) terminal. The $10^{th}$ sensing transistor T10 operates in response to the first brightness select signal SEL0. The $30^{th}$ includes a $30^{th}$ photodiode ID and a $20^{th}$ sensing transistor T20 connected in series between the sensing node N1 and the ground voltage (VSS) terminal. The $20^{th}$ sensing transistor T20 operates in response to the second brightness select signal SEL1. And the $10^{th}$ capacitor C10 can be used as a storage element. Sensitivities of the $10^{th}$, $20^{th}$ and $30^{th}$ photodiodes ID10, ID20 and ID30 may be equal to or different from one another. For instance, the $30^{th}$ photodiode ID30 may have the highest sensitivity and the $10^{th}$ photodiode ID10 may have the lowest sensitivity.

Herein, the $10^{th}$ sensing transistor T10 is turned on when the first brightness select signal SEL0 is at a logic high level. Resultingly, a current path is formed between the sensing node N1 and the ground voltage (VSS) terminal by the $10^{th}$ and $20^{th}$ photodiodes ID10 and ID20, and the amount of current is varied with the quantity of peripheral light. Likewise, the $20^{th}$ sensing transistor T20 is turned on when the second brightness select signal SEL1 is at a logic high level. As a result, a current path is formed between the sensing node N1 and the ground voltage (VSS) terminal by the $10^{th}$ and $30^{th}$ photodiodes ID10 and ID30, and the amount of current is varied with the quantity of peripheral light. When both the first and second brightness select signals SEL0 and SEL1 are at logic high levels, the $10^{th}$ and $20^{th}$ sensing transistors T10 and T20 are turned on. Thus, a current path is formed between the sensing node N1 and the ground voltage (VSS) terminal by the $10^{th}$, $20^{th}$ and $30^{th}$ photodiodes ID10, ID20 and ID30, and the amount of current is varied with peripheral light quantity.

In this way, the sensor 1120 can automatically control the sensitivity according to the plurality of brightness select signals SEL0 and SEL1.

The illumination judgment unit 1300 generates the first and second brightness select signals SEL0 and SEL1 using the lower bit illumination signals CL-L as with the previous exemplary embodiment.

The illumination judgment unit 1300 includes a comparator in which a plurality of preset reference illumination ranges are stored according to at least two reference illuminations. Therefore, the illumination judgment unit 1300 changes logic states of the first and second brightness select signals SEL0 and SEL1 according to the reference illumination range corresponding to the lower bit illumination signal CL-L.

That is, in the case of generating an 8-bit illumination signal CL, the upper 2 bits (upper bit illumination signal CL-H) are determined according to the first and second brightness select signals SEL0 and SEL1. Accordingly, the lower bit illumination signal CL-L uses 6-bit signal. The first brightness select signal SEL0 may be the MSB of the illumination signal CL, and the second brightness select signal SEL1 may be a next MSB of the illumination signal CL. The number of total states expressed using 2 bits is four, i.e., 00, 01, 10 and 11. Thus, the number of the reference illuminations may be three and output logic values of the first and second brightness select signals SEL0 and SEL1 may be one of the four states according to the lower bit illumination signal CL-L and the reference illuminations. Examples will be described below assuming that the reference illuminations are 000100, 001000 and 010000. If the lower bit illumination signal CL-L is lower than 000100, both the first and second brightness select signals SEL0 and SEL1 go to logic high levels. In this case, the quantity of peripheral light is measured by maximizing the sensitivity of the sensor 1120 because of dark surroundings. If the lower bit illumination signal CL-L is higher than 000100 and lower than 001000, the first brightness select signal SEL0 goes to a logic high level but the second brightness select signal SEL1 goes to a logic low level. If the lower bit illumination signal CL-L is higher than 001000 and 010000, both the first and second brightness select signals SEL0 and SEL1 go to logic low levels. In this case, the quantity of peripheral light is measured by minimizing the sensitivity of the sensor 1120 because of bright surroundings.

The number of bits of the brightness select signals SEL0 and SEL1 may be variously changed according to the bits of the illumination signal CL. Since the brightness select signals SEL0 and SEL1 correspond to upper bit values of the illumination signal CL, the number of bits of the brightness select signals SEL0 and SEL1 may be smaller than half the total bits of the illumination signal CL. For example, in the case of using the 8-bit illumination signal CL as described above, the brightness select signal may be a signal of 4-bits or less.

The illumination sensing apparatus 1000 of this embodiment of the invention additionally employs a 2-bit brightness select signal and two photodiodes configured to perform sensing operation according to the 2-bit brightness select signal, thereby accurately measuring the quantity of peripheral light with a maximum of 4 sensitivity states according to the peripheral illumination. However, embodiments of the present invention is not limited to such a configuration. That is, number of the brightness select signals and number of the photodiodes may be greater than 2. Although one photodiode is provided in one sensor in some exemplary embodiments, other embodiments of the present invention are not limited thereto. Thus, a plurality of photodiodes may be provided in a sensor or a sensor unit.

Although exemplary embodiments of the invention illustrate a liquid crystal display, other embodiments of the present invention are not limited thereto. An illumination sensing apparatus of an embodiment of the invention may also be applicable to a plasma display panel (PDP) or an organic light emitting diode (OLED).

As described above, in accordance with the aforesaid exemplary embodiments, an output of an illumination sensing apparatus, which is variable according to peripheral illumination, is used as a feedback signal so that it is possible to automatically control the sensitivity of an illumination sensor.

Furthermore, in accordance with the exemplary embodiments, peripheral illumination sensibility can be improved because the sensitivity of an illumination sensor is automatically controlled according to peripheral illumination.

Moreover, in accordance with the exemplary embodiments, it is possible to reduce number of bits of an illumination signal by setting an MSB value of the illumination signal during operation of controlling sensitivity and setting remaining bits of the illumination signal during operation of measuring peripheral illumination.

In addition, in accordance with an embodiment of the invention, an illumination signal corresponding to peripheral illumination is provided to a light source module to control the output brightness of the light source module, which makes it possible to reduce power consumption and improve image quality.

Although an illumination sensing apparatus, a driving method thereof and a display device having the illumination sensing apparatus have been described with reference to the specific embodiments, they are not limited thereto. Therefore, it will be readily understood by those skilled in the art that various modifications and changes can be made thereto without departing from the spirit and scope of the present invention defined by the appended claims.

What is claimed is:

1. An illumination sensing apparatus comprising:
an illumination sensor unit configured to generate a sensing signal according to peripheral illumination which is an intensity of ambient light;
an illumination determination unit configured to generate an illumination signal according to the sensing signal; and
an illumination judgment unit configured to output a brightness select signal using the illumination signal,
wherein sensitivity of sensing the peripheral illumination of the illumination sensor unit varies according to the brightness select signal.

2. The illumination sensing apparatus of claim 1, wherein the illumination sensor unit comprises a reference sensor and at least one variable sensor, each having at least one optical sensor, and the at least one optical sensor in the at least one variable sensor selectively operate according to the brightness select signal.

3. The illumination sensing apparatus of claim 1, wherein a number of changes in a logic state of the sensing signal is variable according to the peripheral illumination.

4. The illumination sensing apparatus of claim 3, wherein:
the illumination signal is a digital signal having a plurality of bit values, and the brightness select signal is a digital signal of at least 1 bit; and
the illumination determination unit determines upper bit values of the illumination signal using the brightness select signal, and determines remaining bit values other than the upper bit values of the illumination signal using the number of changes in logic state of the sensing signal.

5. The illumination sensing apparatus of claim 4, wherein the illumination determination unit comprises:
a counter configured to count the number of changes in the logic state of the sensing signal to output the counted number as a counting signal; and
an output unit configured to output the illumination signal according to the counting signal and the brightness select signal.

6. The illumination sensing apparatus of claim 5, wherein the counter primarily counts the number of changes in logic state of the sensing signal during a first half frame, and secondarily counts the number of changes in logic state of the sensing signal during a second half frame.

7. The illumination sensing apparatus of claim 5, further comprising an illumination control unit configured to reset the illumination sensor unit and the counter according to an external frame signal.

8. The illumination sensing apparatus of claim 4, wherein
a most significant bit (MSB) value of the illumination signal is determined by the brightness select signal,
a next MSB value of the illumination signal is determined by the brightness select signal, or
an upper 50% of bit values of the illumination signal are determined by the brightness select signal.

9. The illumination sensing apparatus of claim 8, wherein the illumination judgment unit compares the remaining bit values except for the upper bit values of the illumination signal with at least one reference illumination value to change a logic state of the brightness select signal.

10. The illumination sensing apparatus of claim 1, wherein the illumination sensor unit comprises:
a sensor comprising a sensing node, and configured to change a decrease rate of a voltage of the sensing node according to the peripheral illumination;
a voltage supplier configured to supply a power supply voltage to the sensing node; and
a comparator configured to compare the voltage of the sensing node with a reference voltage to output the sensing signal.

11. The illumination sensing apparatus of claim 10, wherein the comparator outputs the sensing signal of logic high level when the voltage of the sensing node is greater than the reference voltage, and outputs the sensing signal of logic low level when the voltage of the sensing node is smaller than the reference voltage.

12. The illumination sensing apparatus of claim 10, further comprising a delay configured to delay the sensing signal by a predetermined delay time.

13. The illumination sensing apparatus of claim 10, wherein the voltage supplier comprises a transfer gate connected between a power supply voltage terminal and the sensing node, the transfer gate operating according to an external reset signal and the sensing signal.

14. The illumination sensing apparatus of claim 10, wherein the sensor comprises:
a first sensor configured to form a current path between the sensing node and a ground voltage terminal according to the peripheral illumination;
at least one second sensor configured to form a current path between the sensing node and the ground voltage terminal according to the brightness select signal and the peripheral illumination; and
a storage unit disposed between the sensing node and the ground voltage terminal, and configured to store the power supply voltage.

15. The illumination sensing apparatus of claim 14, wherein:
the first sensor comprises at least one first photodiode provided between the sensing node and the ground voltage terminal;
the at least one second sensor comprises at least one second photodiode and a sensing transistor which are connected in series between the sensing node and the ground voltage terminal;
the storage unit comprises a capacitor connected between the sensing node and the ground voltage terminal; and
the sensing transistor is turned on according to the brightness select signal.

16. The illumination sensing apparatus of claim 15, wherein the second photodiode is approximately 0.5 to approximately 15 times more sensitive than the first photodiode.

17. A display device comprising:
an illumination sensing apparatus comprising a reference sensor and at least one variable sensor, each having at least one optical sensor, the illumination sensing apparatus generating an illumination signal by selectively using the reference sensor or using the reference sensor and the variable sensor according to peripheral illumination;
a light source module of which output brightness is variable according to the illumination signal; and
a display panel configured to display an image according to brightness of the light source module.

18. The display device of claim 17, wherein the illumination sensing apparatus comprises:
an illumination sensor unit comprising a sensing node, and configured to output a sensing signal according to the peripheral illumination by using the reference sensor or using the reference sensor and one of the at least one reference sensor;

a counting unit configured to count a number of changes in a logic state of the sensing signal to output the counted number as a counting signal;

an output unit configured to output an illumination signal having a plurality of bits using the counting signal and a brightness select signal; and an illumination judgment unit configured to generate the brightness select signal using predetermined bits of the illumination signal, wherein the variable sensor is enabled according to the brightness select signal.

19. The display device of claim 18, wherein the counter is reset twice during one frame according to a reset signal of the display panel.

20. A method of driving an illumination sensing apparatus, the method comprising:

detecting an initial illumination signal according to peripheral illumination using a portion of a plurality of photodiodes included in the illumination sensing apparatus;

comparing a value of the initial illumination signal with a reference illumination value; and detecting the illumination signal according to the peripheral illumination using the portion of the photodiodes when the value of the initial illumination signal is greater than the reference illumination value, and sensing the illumination signal according to the peripheral illumination using the plurality of photodiodes when the value of the initial illumination signal is smaller than the reference illumination value.

* * * * *